No. 640,927. Patented Jan. 9, 1900.
R. MITCHELL, Jr.
SHIELDED RUBBER TIRE FOR VEHICLES.
(Application filed June 26, 1899.)
(No Model.)
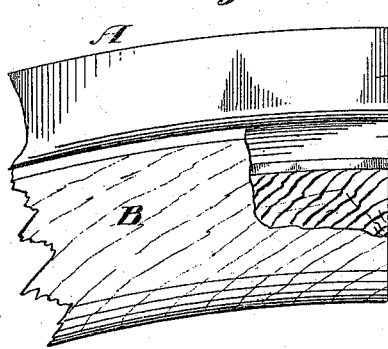
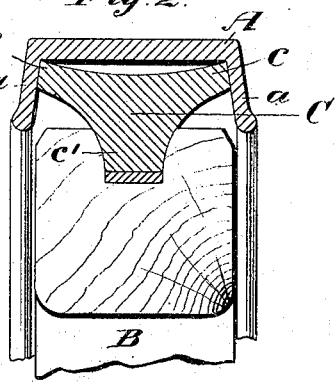
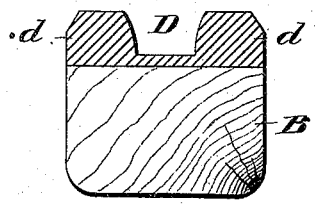
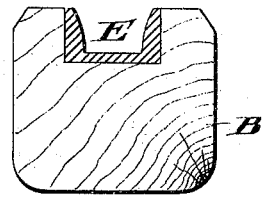

UNITED STATES PATENT OFFICE.

ROBERT MITCHELL, JR., OF GLASGOW, SCOTLAND.

SHIELDED RUBBER TIRE FOR VEHICLES.

SPECIFICATION forming part of Letters Patent No. 640,927, dated January 9, 1900.

Application filed June 26, 1899. Serial No. 721,811. (No model.)

*To all whom it may concern:*

Be it known that I, ROBERT MITCHELL, Jr., blacksmith, a subject of the Queen of the United Kingdom of Great Britain and Ireland, residing at 84 Kent road, Glasgow, Scotland, have invented new and useful Improvements in Shielded Rubber Tires for Vehicles of All Descriptions, of which the following is a specification.

This invention relates to improvements in rubber tires for vehicles of all descriptions in which the resilient portion of the tire is shielded from the ground by an outer steel or iron channel-tire, and has for its object, by an improved arrangement and construction of the several parts constituting the tire, to insure that the outer or ground tire is completely isolated from the other parts of the wheel by the rubber or other resilient material, thus stifling and preventing the transmission of vibration to the carriage or vehicle to which the wheels are fitted and overcoming the defect found in tires as at present in use.

In order that my said invention may be more readily understood and easily carried into effect, I will proceed to describe the same with reference to the accompanying sheet of drawings, in which—

Figure 1 is a side view, and Fig. 2 a cross-section, of a portion of the felly of a wheel fitted with my improved tire. Figs. 3 and 4 are cross-sections showing two modified means whereby the resilient portion of the tire may be connected to or secured upon the felly of the wheel.

Referring to Figs. 1 and 2 of the said drawings, I employ an outer metal or ground tire A of a channel shape in section bent to the circumference of the wheel, with its channel or grooved-out portion looking toward the center or hub thereof, the flat sole of the channel thus revolving on the ground when the wheel is in motion. The free edges of the webs $a$ of the channel ground-tire A are on a level with or slightly below the topmost edge of the felly B when the highest point of the wheel is considered, but do not in the resting position or under ordinary circumstances have actual contact with the felly, but stand clear of it on both sides.

The resilient portion of the tire consists of a strip C, of rubber or other suitable material, surrounding the wheel of the section shown—that is to say, having the butt $c$ of a breadth equal to the inner sole of the outer ground-tire A, against which it bears. The surface of this butt fits accurately into the ground-tire when pressure is exerted on same, but may not, however, lie flat against the inside sole when the pressure is removed, but be formed concave, as shown, thus increasing the resiliency. The surface of the butt $c$ does not fill the whole depth of the channel, measuring from edge of web to bottom of groove, as the lower portion is reserved for expansion, but by reason of its breadth and concavity of surface expands itself under pressure into the channel or grooved tire, and thus effectually prevents the said outer tire coming into contact with the felly of the wheel.

The tail portion $c'$ of the rubber tire C may be of any convenient shape in section and retained in a groove of corresponding shape formed in the felly of the wheel, as in Figs. 1 and 2, or may be retained by a channel-iron tire D, having broad webs $d$ secured upon the felly of the wheel, as shown in Fig. 3, or the rubber tire may be secured by a small channel-iron E, recessed or embedded in the felly of the wheel, as shown in Fig. 4. When the groove is made directly in the wood of the felly, as first described, a small iron tire or wire $d'$ may be employed for binding the various segments together.

The rubber tire C may be made of a continuous strip of rubber, either solid or formed with a core through its center, or the tire may be made up of sections of solid rubber or cored-out sections, either sealed or open at the ends.

I claim—

1. The combination of the externally-grooved felly B, the channeled metal tire A having flanges $a$, $a$, embracing the sides of said felly and the rubber tire C having an outer butt portion $c$ fitting laterally in the internal channel of the tire A without filling the entire cavity of the channel, and an inwardly-projecting flange $c'$ fitting the groove of the felly, substantially as set forth.

2. The combination of the outer channel-shaped ground-tire A, the externally-grooved felly B adapted to play within the flanges $a$, of the tire A, the inner rubber tire C having an outer butt portion $c$ fitting laterally within the flanges $a$ of the outer tire, and a binder $d'$ encircling the felly B, substantially as and for the purposes set forth.

ROBERT MITCHELL, JR.

Witnesses:
W. B. CRAIG,
JOHN R. CRAIG.